United States Patent [19]
Platell

[11] Patent Number: 5,896,746
[45] Date of Patent: Apr. 27, 1999

[54] ENGINE ASSEMBLY COMPRISING AN INTERNAL COMBUSTION ENGINE AND A STEAM ENGINE

[75] Inventor: Ove Platell, Sigtuna, Sweden

[73] Assignee: Ranotor Utvecklings AB, Sigtuna, Sweden

[21] Appl. No.: 08/750,834

[22] PCT Filed: Jun. 19, 1995

[86] PCT No.: PCT/SE95/00754

§ 371 Date: Dec. 19, 1996

§ 102(e) Date: Dec. 19, 1996

[87] PCT Pub. No.: WO95/35433

PCT Pub. Date: Dec. 28, 1995

[30] Foreign Application Priority Data

Jun. 20, 1994 [SE] Sweden .................................. 9402180

[51] Int. Cl.[6] ...................................................... F02G 3/00
[52] U.S. Cl. ................................ 60/620; 60/659; 60/668; 60/712; 60/713
[58] Field of Search ............................. 60/620, 618, 659, 60/668, 712, 713

[56] References Cited

FOREIGN PATENT DOCUMENTS

| 0 439 754 | 8/1991 | European Pat. Off. . |
| 686 911 | 1/1940 | Germany . |
| 288 644 | 4/1991 | Germany .................................. 60/618 |

OTHER PUBLICATIONS

Patent Abstracts of Japan, vol. 7, No. 283, M–263 58–158304 (NIPPON KOKAN K.K.) Sep. 20, 1983.

Primary Examiner—Noah P. Kamen
Attorney, Agent, or Firm—Jacobson, Price, Holman & Stern, PLLC

[57] ABSTRACT

An engine assembly that includes an internal combustion engine and a steam engine both designed to operate at speeds of optimal efficiency at normal engine driving conditions. A heat exchanger recovers heat losses from the internal combustion engine's exhaust gases and coolant to produce steam to operate the steam engine. Excess steam produced by the heat exchanger but not directly used by the steam engine is supplied to a steam buffer which stores the excess steam and energy and delivers steam to drive the steam engine during short periods of high load as required. The engine assembly is particularly advantageous in applications for propulsion of heavy vehicles such as trucks, freight trains or ships.

7 Claims, 1 Drawing Sheet

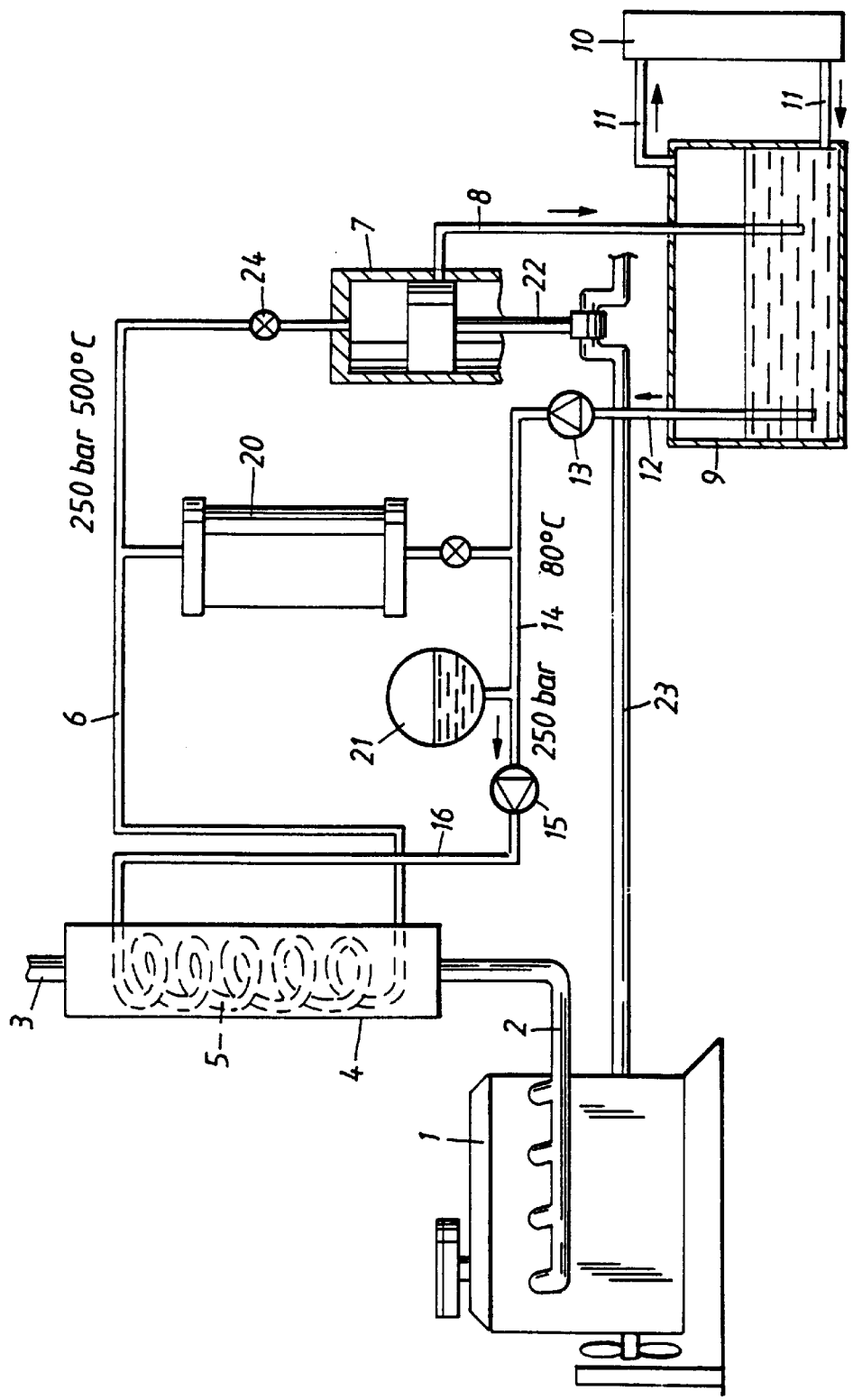

ENGINE ASSEMBLY COMPRISING AN INTERNAL COMBUSTION ENGINE AND A STEAM ENGINE

BACKGROUND OF THE INVENTION

1. Field of the Invention

The present invention refers to an engine assembly that includes an internal combustion engine and a steam engine connected to a driving assembly, for instance, by a common driving axle, and further includes a heat exchanged by which heat losses, from exhaust gases or cooling water, or both, from the internal combustion engine are utilized for generating steam to the steam engine.

2. Description of the Related Art

It is conventional to utilize combustion gases from an internal combustion engine in order to improve its efficiency, an internal combustion engine referring here to otto-cycle and diesel engines. The most common device presently in use is an exhaust driven turbo turbine driving a turbo compressor for supercharging the intake combustion air, which improves the performance of the engine at high shaft speeds. In large ships it is also customary to use steam turbines in order to utilize the heat from the exhaust gases of diesel engines. It has also been proposed to use exhaust gas heat from an internal combustion engine in a Rankine cycle process for the purpose of increasing engine efficiency. However, in conventional steam technology, the steam engine with its auxiliary system is too bulky and heavy. Therefore, these conventional systems have not been considered as a realistic alternative for vehicles in which weight and space demands are of great importance.

From a thermodynamic point of view, a piston steam engine could be a possible solution for utilizing the heat losses of an internal combustion engine. However, in such a case, the weight and space demands of the system must be considerably reduced compared to that provided by present steam technology.

SUMMARY OF THE INVENTION

An object of the present invention is to provide an engine assembly of the previously discussed type, having smaller dimensions and less weight to optimize the flexibility afforded by a reasonable steam engine system.

This objective is achieved according to the present invention because the steam engine is a displacement type engine with a built-in engine braking capability. The excess steam from the heat exchanger is not directly used for driving the steam engine but is instead fed to a steam buffer which is designed to supply steam for short periods to the steam engine with a high power density.

The present invention is directed on the utilization of a steam buffer of the type described in detail in a co-pending U.S. application Ser. No. 08/750,833 entitled "Steam Buffer For A Steam Engine Plant", to which reference is here made regarding the details about the steam buffer. This steam buffer is equipped with a high temperature connection for steam, preferably with a temperature about 500° C. with a pressure of about 250 bar, and a low temperature connection for feed water. A solid heat exchanging structure with a large number of pressure resistant flow channels having a hydraulic diameter less than 0.5 mm for the steam and feed water is located between the two connections. It has been found that an energy density output of at least 500 kJ/kg and a power density output of 100 kW/kg is possible with this design, compared to a lead-acid battery having an energy density output of 100 kJ/kg and a power density output of only 100 W/kg.

Typically, vehicle engines are used at a very low power output as compared to its maximum power output, which should be available for some situations mostly during short periods of time. Fuel consumption for a vehicle will therefore be determined by its efficiency at these normal low loads. The present invention also relies on the knowledge that an internal combustion engine has its highest efficiency at high loads whereas a steam engine of the displacement or piston type has its highest efficiency at low loads. A diesel engine having an efficiency of 45% at these low load conditions will get an increase in efficiency by 10–15 percentage points from the steam engine, through which the total efficiency of the assembly can be increased to approximately 55–60%. The diesel engine is designed small enough to operate at full load during normal driving conditions or cycles. The steam engine is designed so that it will operate at a very low load when it uses the energy from the diesel exhaust gases, as the total driving system operates in normal driving conditions or cycles. Short requirements of high power output can be supplied in bursts by the steam buffer, which can immediately increase the power output from the steam engine, for instance, from 30 kW at 5% load at normal driving to 600 kW at 100% load.

Because of the high contribution from the steam engine to total power performanceand the small addition to the total weight and space required, a very high power density output of the total engine assembly is achieved.

One of the reasons that the steam engine should be a displacement or piston type is because such a steam engine can be designed having an effective engine brake capability, which is of great importance in many vehicles. The braking energy can also be regenerated in the steam buffer.

This very high braking capability of a displacement steam engine will save or perhaps replace the conventional brakes in applications where overheating problems occur.

The engine assembly according to the present invention is especially suitable for propulsion of heavy vehicles, like trucks and long freight trains or boats, and especially boats that require high power output for short periods of time in order to reach planing velocities rapidly.

BRIEF DESCRIPTION OF THE DRAWING

The present invention is described in more detail in the following with reference to the attached figure, which schematically illustrates an example of an embodiment of the engine assembly for a heavy vehicle application according to the present invention.

DESCRIPTION OF THE PREFERRED EMBODIMENT

The drawing illustrates an internal combustion engine of the diesel type, which can also be a Otto type engine which has higher exhaust heat losses to regenerate, with an exhaust pipe 2, which is connected to the exhaust pipe 3 through a heat exchanger 4. The heat from the coolant or cooling water of the engine can also be utilized especially if the cooling water or coolang is pressurized. For a marine application, where the feed water is heated from approximately 20° C., the coolant can be used for preheating the feed water to about 80–100° C., and then the exhaust gases can be used for heating. The illustrated heat exchanger has a heat absorbing part 5 forming a part of a pipe for steam 6, which is dimensioned for high pressure at 250 bar and a steam temperature of 500° C. and leads to a steam engine 7 of an axial piston type. From the outlet of the steam engine a pipe 8 leads to a condenser 9, which is connected to a cooler 10 by the pipes 11. From condenser 9 there is a pipe 12 having a feed water pump 13, which pressurizes the water to 250 bar in a pipe 14 leading to a circulation pump 15. A pipe 16 leads the feed water to the heat absorbing part 5 of the heat exchanger 4, where the feed water is vaporized and heated to 500° C. by the heat exhaust gases from the pipe 2. Between the pipe 6 having the steam at a temperature of 500° C. and the pipe 14 having the feed water temperature at approximately 80° C. is connected to the above-mentioned steam buffer 20. The pipe 14 is further connected with a pressure vessel 21 containing feed water and a gas cushion. The steam engine 7 is connected by a transmission 22 to a driving shaft 23, which is connected with the crankshaft of the engine 1.

The diesel engine 1 is dimensioned to operate at full load at normal driving conditions or cycles and drive the drive shaft 23, to which the steam engine 7 is also connected. The steam engine is dimensioned to operate at low loads at normal driving conditions or cycles. Both engines will then operate at or near their optimum efficiency. The steam to the steam engine 7 is generated in the heat exchanger 4 in an amount that is slightly larger than what is required at normal driving conditions or cycles. The excess steam is fed to the steam buffer 20, and the feed water in the steam buffer is pressed back to the pipe 14 and then further to the pressure vessel 21, where the gas cushion is compressed. When a high power output is required, for instance, at overtaking speeds or at a steep upward slope, a control valve 24 will be opened in the pipe 6 to the steam engine 7 from a position corresponding to low load to a position corresponding to full load. Steam with the highest or a required power capacity will then flow from the steam buffer 20 the steam engine 7. For an application of the present invention in a heavy truck where the average power at normal driving conditions is about 80 kW the diesel engine would be designed to give 70 kW at 100% load and the steam engine to give 30 kW at 5% load. At normal driving conditions requiring 80 kW, both engines will work at almost optimal efficiency while simultaneously continuously charging the steam buffer if not already fully charged. Since the steam engine has a maximum power output of 600 kW, the engine assembly can, if the steam buffer is charged, give 670 kW instantaneously. The time possible at this power depends on the size of the steam buffer, which, as mentioned previously, can have an energy density of 500 kJ/kg.

The present invention is not restricted to this shown and described example but can be modified in several ways within the scope of the inventive idea as defined by the claims. The two engines can, for instance, be connected to different drive shafts of some type of driving assembly. Further, a small steam generator can be connected to the steam pipe 6 for generation of steam as a complement to the heat exchanger 4, if required, for instance, to keep the steam system warm when there is freezing hazard. As previously mentioned, the steam buffer has a very high energy density of 500 kJ/kg, and with a proper heat insulation there will be possibilities to store heat energy for long time periods. Hence, there are possibilities for running the engine assembly for a limited time period without running the internal combustion engine, for instance, without emission of exhaust gases.

I claim:

1. An engine assembly comprising an internal combustion engine and a steam engine both connected to a driving assembly a heat exchanger adapted for utilizing heat losses of said internal combustion engine from its exhaust gases for generation of steam to be delivered to said steam engine, said steam engine being of displacement type with built-in engine braking capability, and a steam buffer adapted to be supplied with excess steam generated from said heat exchanger in excess of the steam used directly for driving said steam engine, and said steam buffer adapted to supply to said steam engine the excess steam in the form of high power density steam for short time periods when required.

2. An engine assembly according to claim 1, wherein said internal combustion engine is a diesel engine and said steam engine is a multiple cylinder axial piston engine that can tolerate a steam pressure of about 250 bar and a steam temperature of about 500° C.

3. An engine assembly according to claim 1, wherein said internal combustion engine operates at least near full load at normal driving cycles and said steam engine is designed to operate at low load at normal driving cycles.

4. An engine assembly according to claim 3 for propulsion of heavy vehicles wherein said internal combustion engine operates at least near full load while said steam engine is operated at least near 5% load at normal driving cycles.

5. An engine assembly as described in claim 1, wherein said heat exchanger is adapted to utilize heat losses of said internal combustion engine from both its exhaust gases and coolant for generation of steam to said steam engine.

6. An engine assembly comprising an internal combustion engine, a steam engine, a driving assembly driven by both a drive of said internal combustion engine and a drive of said steam engine, a heat exchanger that absorbs heat losses fed from said internal combustion engine and produces steam to feed to said steam engine, a steam buffer to receive and store excess steam produced by said heat exchanger and in excess of that used by said steam engine, and said steam buffer capable of feeding the excess steam stored to said steam engine in a high power diversity burst for increasing the density of said steam engine.

7. The assembly as claimed in claim 6, wherein said steam engine has a built-in braking capability to produce braking energy absorbed by said steam buffer.

* * * * *